(12) United States Patent
Wu

(10) Patent No.: US 9,405,502 B2
(45) Date of Patent: Aug. 2, 2016

(54) ELECTRONIC DEVICE AND METHOD FOR ADJUSTING VOLUME SETTING THEREFROM

(71) Applicant: Chiun Mai Communication Systems, Inc., New Taipei (TW)

(72) Inventor: Hui-Chun Wu, New Taipei (TW)

(73) Assignee: Chiun Mai Communication Systems, Inc., New Taipei (TW)

(*) Notice: Subject to any disclaimer, the term of this patent is extended or adjusted under 35 U.S.C. 154(b) by 169 days.

(21) Appl. No.: 14/467,747

(22) Filed: Aug. 25, 2014

(65) Prior Publication Data

US 2015/0055801 A1 Feb. 26, 2015

(30) Foreign Application Priority Data

Aug. 26, 2013 (CN) .......................... 2013 1 0374095

(51) Int. Cl.
*H03G 3/00* (2006.01)
*G06F 3/16* (2006.01)
*H04R 3/00* (2006.01)

(52) U.S. Cl.
CPC ........ *G06F 3/165* (2013.01); *H04R 3/00* (2013.01); *H04R 2430/01* (2013.01); *H04R 2460/07* (2013.01); *H04R 2499/11* (2013.01)

(58) Field of Classification Search
CPC ..... H04L 63/08; H04L 63/0823; H04L 63/14; H04L 63/168; H04L 67/02; H04R 2430/01; H04R 2460/07; H04R 2499/11; H04R 3/00; G10L 15/02; G10L 15/063; G10L 15/197; G10L 25/33; H04M 1/026; H04M 1/72527; H04M 1/72533; H04M 1/72544; H04M 1/72569; H04M 1/72572; H04M 1/72583; H04N 21/2385; H04N 21/4524; H04N 21/4788

USPC ......................... 381/103–107, 56–58; 700/94

See application file for complete search history.

(56) References Cited

U.S. PATENT DOCUMENTS

| | | | | |
|---|---|---|---|---|
| 6,996,445 | B1 * | 2/2006 | Kamijo | G06F 3/165 381/104 |
| 7,278,101 | B1 * | 10/2007 | Cassezza | G06F 3/04847 381/104 |
| 7,933,418 | B2 * | 4/2011 | Morishima | H04R 5/02 381/105 |
| 8,995,685 | B2 * | 3/2015 | McCarthy | H03G 3/32 381/107 |
| 2015/0010167 | A1 * | 1/2015 | Arling | H04N 21/42226 381/105 |

* cited by examiner

Primary Examiner — Lun-See Lao
(74) Attorney, Agent, or Firm — ScienBiziP, P.C.

(57) ABSTRACT

In a method for adjusting a volume setting of an electronic device, a current location and a current time are obtained. The method determines whether a volume state file corresponding to the executed application is stored in a storage system. When no volume state file of the executed application is stored, the volume state file is created and a time period corresponding to the current time, the current location and a volume level corresponding to a preset volume setting are recorded as a volume state package into the volume state file. When the volume state file of the executed application is stored in the storage system, the volume setting of the electronic device is adjusted according to a volume level of a matching volume state package matching the current time and the current location in the volume state file.

18 Claims, 3 Drawing Sheets

ELECTRONIC DEVICE AND METHOD FOR ADJUSTING VOLUME SETTING THEREFROM

CROSS-REFERENCE TO RELATED APPLICATIONS

This application claims priority to Chinese Patent Application No. 201310374095.9 filed on Aug. 26, 2013 in the State Intellectual Property Office of the People's Republic of China, the contents of which are incorporated by reference herein.

FIELD

Embodiments of the present disclosure relate to adjustment technology, and particularly to an electronic device and a method for adjusting a volume setting of the electronic device.

BACKGROUND

Electronic devices (for example, mobile phones) can switch different profiles under different circumstances for adjusting volume settings of the electronic devices according to user's preference. Most electronic devices can adjust volume settings automatically by detecting conditions (for example, ambient noise) surrounding the electronic devices. However, the volume settings of the electronic device corresponding to different applications in the electronic device are different under different circumstances and time periods. The electronic device cannot adjust the volume settings for the different applications intelligently.

BRIEF DESCRIPTION OF THE DRAWINGS

Implementations of the present disclosure will be described, by way of example only, with reference to the following drawings. The modules in the drawings are not necessarily drawn to scale, the emphasis instead being placed upon clearly illustrating the principles of the present disclosure. Moreover, in the drawings, like reference numerals designate corresponding portions throughout the views.

DETAILED DESCRIPTION

Figure 1:
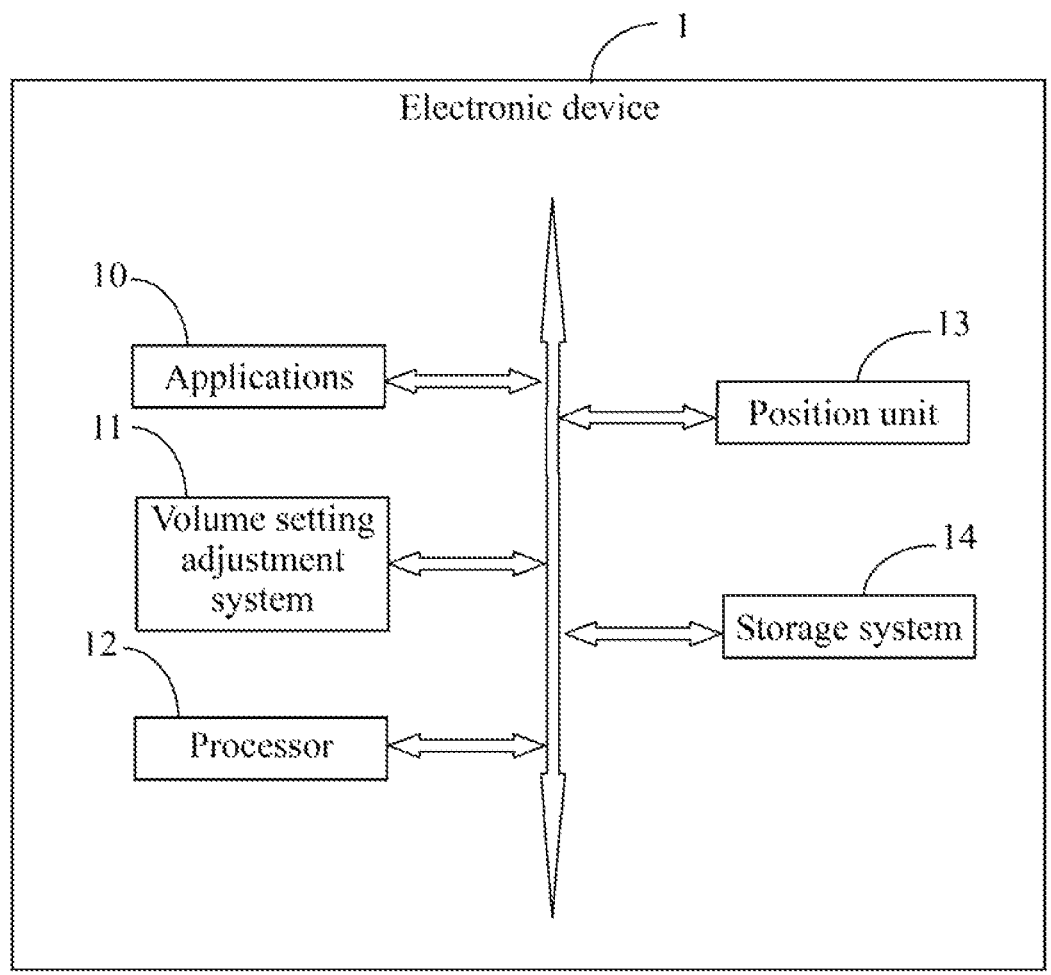
FIG. 1 is a block diagram of one embodiment of an electronic device including a volume setting adjustment system.

The present disclosure, including the accompanying drawings, is illustrated by way of examples and not by way of limitation. It should be noted that references to "an" or "one" embodiment in this disclosure are not necessarily to the same embodiment, and such references can mean "at least one," or "one or more." It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In the present disclosure, "module," refers to logic embodied in hardware or firmware, or to a collection of software instructions, written in a program language. In one embodiment, the program language can be Java, C, or assembly. One or more software instructions in the modules can be embedded in firmware, such as in an erasable programmable read only memory (EPROM). The modules described herein can be implemented as either software and/or hardware modules and can be stored in any type of non-transitory computer-readable media or storage medium. Non-limiting examples of a non-transitory computer-readable medium include CDs, DVDs, flash memory, and hard disk drives. The term "comprising" means "including, but not necessarily limited to"; it specifically indicates open-ended inclusion or membership in a so-described combination, group, series and the like.

FIG. 1 is a block diagram of one embodiment of an electronic device including a volume setting adjustment system. In one embodiment, the electronic device 1 can be a mobile phone, a tablet computer, or any other electronic device. The electronic device 1 further includes, but is not limited to, one or more applications 10, a volume setting adjustment system 11, at least one processor 12, a position unit 13, and a storage system 14. The applications 10 are software programs which can output sounds according a volume setting of the electronic device 1 when the electronic device 1 executes the applications 10. For example, the application 10 can be a music player software, a video player software, or a game software installed in the electronic device 1. The volume setting adjustment system 11 can start to adjust a volume setting of the electronic device 1 for one of the applications 10 automatically when the electronic device 1 executes the application 10.

The position unit 13 can obtain a current location of the electronic device 1. For example, the position unit 13 can be a Global Positioning System (GPS). The at least one processor 12 executes one or more computerized codes and other applications of the electronic device 1 to provide functions of the volume setting adjustment system 11. In one embodiment, the storage system 14 may be an internal storage system, such as a random access memory (RAM) for temporary storage of information, and/or a read only memory (ROM) for permanent storage of information. The storage system 14 can also be an external storage card, such as a smart media card or a secure digital card.

Figure 2:
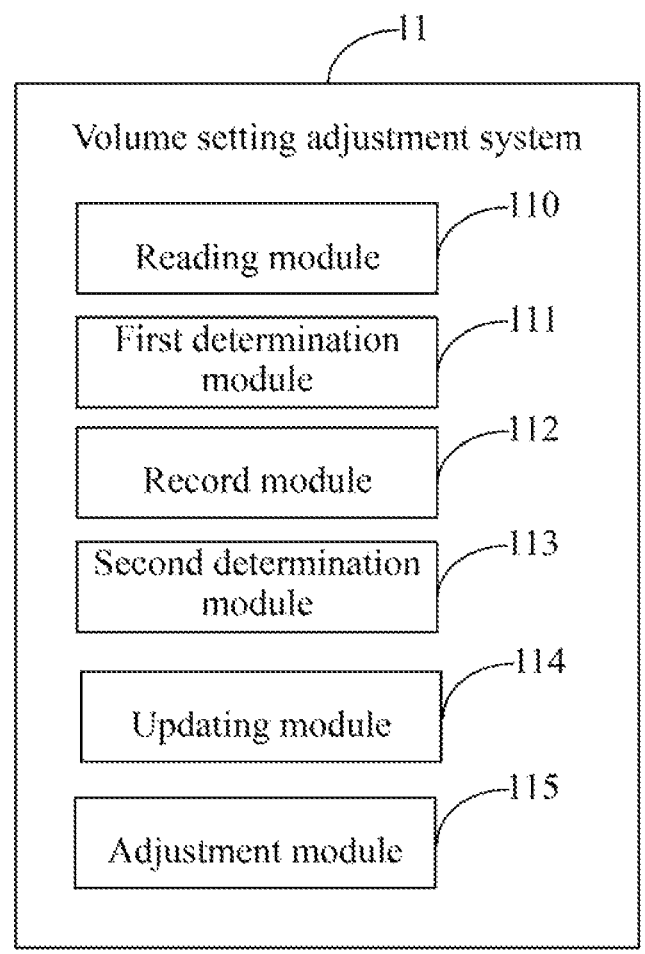
FIG. 2 is a block diagram of one embodiment of the volume setting adjustment system of the electronic device of FIG. 1.

FIG. 2 is a block diagram of one embodiment of the volume setting adjustment system of the electronic device of FIG. 1. In this embodiment, the volume setting adjustment system 11 includes, but is not limited to, a reading module 110, a first determination module 111, a recording module 112, a second determination module 113, an updating module 114, and an adjustment module 115. The modules 110-115 include computerized code in the form of one or more programs that are stored in the storage system 14. The computerized code includes instructions that are executed by the at least one processor 12 to provide functions of the volume setting adjustment system 11.

When the electronic device 1 starts to execute one of the applications 10, the reading module 110 configures to read a current location and a current time of the electronic device 1 at a predetermined time interval. For example, the predetermined time interval can be 5 minutes. The reading module 110 can obtain the current location from the position unit 13.

The first determination module 111 configures to determine whether a volume state file corresponding to the executed application 10 is stored in the storage system 14. In one embodiment, if the storage system 14 stores a file with a specified name including a name of the executed application 10, the first determination module 111 determines that the volume state file corresponding to the executed application 10 is stored in the storage system 14. The specified name can include preset characters and the name of the executed application. For example, if the name of the executed application is "music player", the specified name of the specified file can set to be "volume state of music player".

In one embodiment, the volume state file can store one or more volume state packages for recording volume levels of an application under different situations. Each of the volume state packages can include volume levels corresponding to different locations and time periods, for example, a first location and a first time period corresponding to a volume level "5", and a first location and a second time period corresponding to a volume level "1". The different time periods can be preset according the time of one day, and the number of the time periods can be preset according user's preference. For example, the first time period can be preset to be a time period from 8:00 a.m. to 8:00 p.m., and the second time period can be preset to be a time period from 8:01 p.m. to 7:59 a.m.

If no volume state file of the executed application is stored in the storage system 14, the recording module 112 configures to create a volume state file corresponding to the executed application 10 in the storage system 14 according to the name of the executed application 10, and record a time period corresponding to the current time, the current location and a volume level corresponding to a preset volume setting of the electronic device 1 as a volume state package into the volume state file.

If the volume state file of the executed application is stored in the storage system 14, the second determination module 113 configures to determine whether there is a first volume state package which includes a specified location matching the current location in the volume state file. In this embodiment, when a distance between the current location and a location of a volume state package is within a preset range (for example, a range of [0 meter, 10 meter]), the second determination module 113 determines that the location is the specified location matching the current location, and determines that the volume state package corresponding to the specified location is the first volume state package.

If there are one or more first volume state packages in the volume state file, the second determination module 113 further determines whether there is a matching volume state package which includes a specified time period matching the current time from the first volume state package. If the current time belongs to a time period of a first volume state package, the second determination module 113 determines that the time period is the specified time period matching the current time, and determines that the first volume state package corresponding to the specified time period is the matching volume state. In the embodiment, the matching volume state package includes the specified location and the specified time period respectively matching the current location and the current time.

The adjustment module 115 configures to adjust a volume setting of the electronic device 1 according to a volume level of the matching volume state package.

If neither the first volume state package nor the matching volume state package in the volume state file, the updating module 114 configures to record the volume state package according to the current location, the current time and the volume level of the electronic device, and add the recorded volume state package into the volume state file of the executed application.

The second determination module 113 further determines whether the volume setting of the electronic device 1 changes when electronic device 1 executes the executed application 10 with the preset volume setting or the adjusted volume setting.

If the volume setting of the electronic device 1 changes, the updating module 113 further updates the volume level of the recorded volume state package or of the matching volume state package according to the changed volume setting.

In other embodiment, when the electronic device 1 switches a profile of the electronic device 1 to be a silent mode, the recording module 112 can record a location when switching into the silent mode. The reading module 110 can read the current location of the electronic device 1 periodically. When the current location matches the recorded location, the adjustment module 115 can prompt a user of the electronic device 1 that whether to start the silent mode or not. The adjustment module 115 can vibrate the electronic device 1 and display two choices of selecting the silent mode or not on a display screen of the electronic device 1. After the electric device 1 switches the profile to be the silent mode according to the prompt, the reading module 110 further determines whether a distance between the current location and recorded location exceeds a preset distance (for example, 30 meters). If the distance between the current location and recorded location exceeds the preset distance, the adjustment module 115 can prompt the user whether to turn off the silent mode or not, and adjust the profile according to use's operations.

Figure 3:
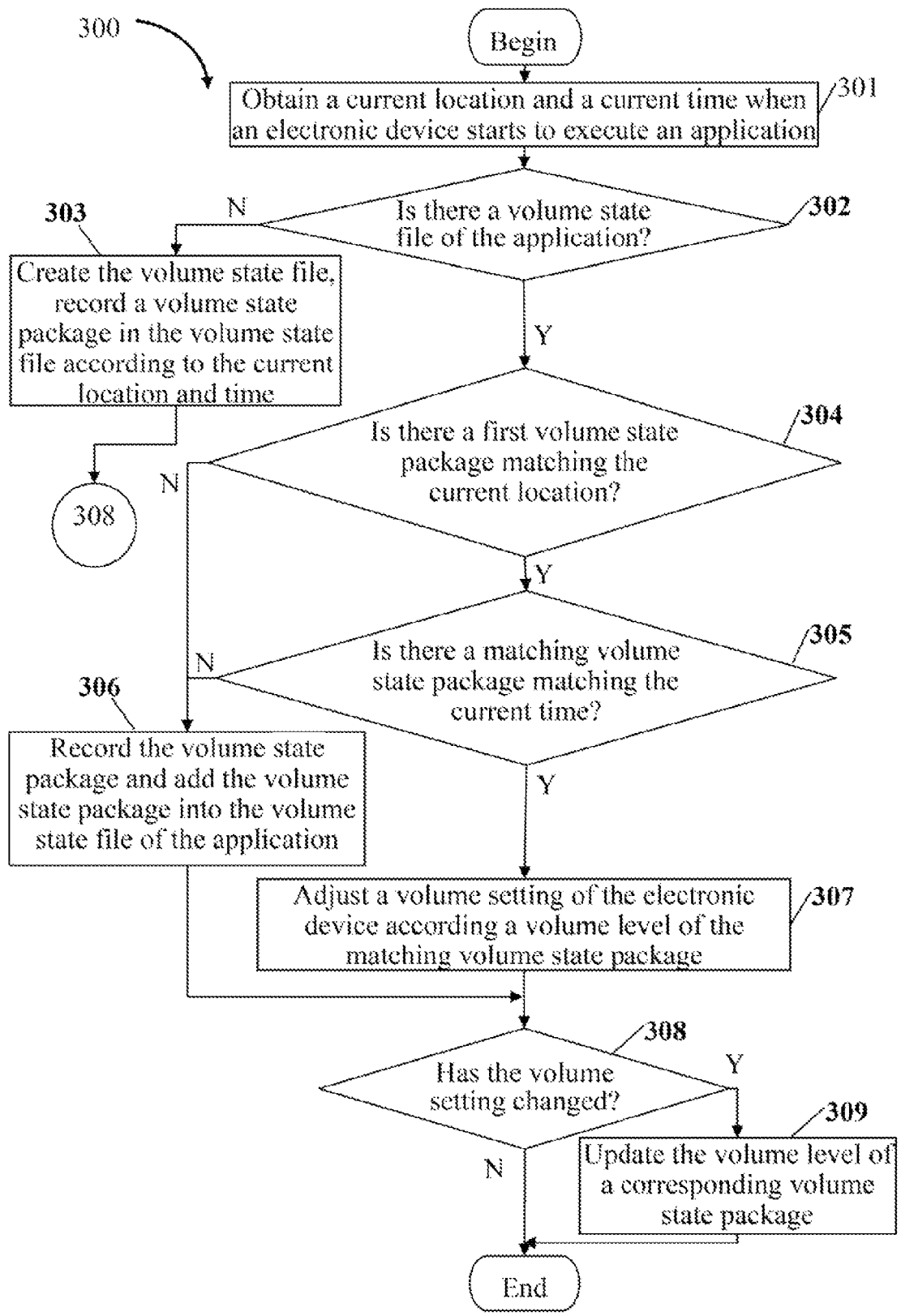
FIG. 3 is a flowchart of one embodiment of a method of adjusting a volume setting of the electronic device in FIG. 1.

FIG. 3 is a flowchart of one embodiment of a method 300 for controlling communication notification of an electronic device. Depending on the embodiment, additional blocks can be added, others removed, and the ordering of the blocks can be changed. In the embodiment, the method 300 is performed by execution of computer-readable software program codes or instructions by at least one processor of a computing device. The method 300 is provided by way of example, as there are a variety of ways to carry out the method. The method 300 described below can be carried out using the configurations illustrated in FIG. 1-FIG. 2, for example, and various elements of these figures are referenced in explaining method 300. Each block shown in FIG. 3 represents one or more processes, methods or subroutines, carried out in the method 300. Additionally, the illustrated order of blocks is by example only and the order of the blocks can change according to the present disclosure. The example method 300 can begin at block 301.

In block 301, when the electronic device 1 starts to execute an application 10, a reading module reads a current location and a current time of the electronic device 1 at a predetermined time interval. For example, the predetermined time interval can be 5 minutes. The reading module can obtain the current location from the position unit 13.

In block 302, a first determination module determines whether a volume state file corresponding to the executed application 10 is stored in the storage system 14. In one embodiment, if there is a file with a specified name including a name of the executed application 10, the first determination module determines that there is the volume state file corresponding to the executed application 10. The specified name can include preset characters and the name of the executed application. If a volume state file corresponding to the executed application 10 is stored in the storage system 14, block 304 is implemented. If no volume state file corresponding to the executed application 10 is stored in the storage system 14, block 303 is implemented.

In one embodiment, the volume state file can stores one or more volume state packages for recording volume levels of an executed application under different situations. Each of the volume state packages can include volume levels corresponding to different locations and time periods. The different time periods can be preset according the time of one day, and the number of the time periods can be preset according user's preference.

In block 303, a recording module creates the volume state file corresponding to the executed application 10 in the storage system 14 according to the name of the executed application 10, and records a time period corresponding to the current time, the current location and a volume level corresponding to a preset volume setting of the electronic device 1 as a volume state package into the volume state file, and block 308 is implemented.

In block 304, a second determination module determines whether there is a first volume state package which includes a specified location matching the current location in the volume state file. In this embodiment, when a distance between the current location and a location of a volume state package is within a preset range (for example, a range from 0 meter to 10 meter), the second determination module determines that the location is the specified location matching the current location, and determines that the volume state package corresponding to the specified location is the first volume state package. If there are one or more first volume state packages in the volume state file, block 305 is implemented. If there is no first volume state package in the volume state file, block 306 is implemented.

In block 305, the second determination module determines whether there is a matching volume state package which includes a specified time period matching the current time from the first volume state package. In this embodiment, if the current time belongs to a time period of a first volume state package, the second determination module determines that the time period is the specified time period matching the current time, and determines that the first volume state package corresponding to the specified time period is the matching volume state. If there is the matching volume state package from the first volume state package, block 307 is implemented. If there is no matching volume state package, block 306 is implemented.

In block 306, an updating module records a new volume state package including the current location, the time period of the current time and the volume level of the electronic device 1 into the volume state file of the executed application, and block 308 implemented.

In block 307, an adjustment module adjusts a volume setting of the electronic device 1 according to a volume level of the matching volume state package.

In block 308, the second determination module determines whether the volume setting of the electronic device 1 changes when executing the executed application 10. If the electronic device 1 does not change the volume setting or the executed application 10 is not executed, the procedure ends.

In block 309, when the volume setting of the electronic device 1 changes and the application 10 is executed, the updating module updates the volume level of the recorded volume state package or the volume level of the matching volume state package according to the changed volume setting.

All of the processes described above can be embodied in, and fully automated via, functional code modules executed by one or more general purpose processors such as the processor 12. The code modules can be stored in any type of non-transitory readable medium or other storage system such as the storage system 14. Some or all of the methods can alternatively be embodied in specialized hardware. Depending on the embodiment, the non-transitory readable medium can be a hard disk drive, a compact disc, a digital versatile disc, a tape drive, or other storage medium.

The described embodiments are merely examples of implementations, and have been set forth for a clear understanding of the principles of the present disclosure. Variations and modifications may be made without departing substantially from the spirit and principles of the present disclosure. All such modifications and variations are intended to be included within the scope of this disclosure and the described inventive embodiments, and the present disclosure is protected by the following claims and their equivalents.

What is claimed is:

1. A computer-implemented method for adjusting a volume setting of an electronic device, the method comprising:

obtaining a current location and a current time of the electronic device at a predetermined time interval when the electronic device executes an application;

determining whether a volume state file corresponding to the executed application is stored in a storage system of the electronic device;

creating the volume state file corresponding to the executed application in the storage system when no volume state file corresponding to the executed application is stored in the storage system, and recording a time period corresponding to the current time, the current location and a volume level corresponding to a preset volume setting of the electronic device as a volume state package into the volume state file;

adjusting the volume setting of the electronic device according to a volume level of a matching volume state package in the volume state file when the volume state file corresponding to the executed application is stored in the storage system, wherein the matching volume state package comprises a specified location matching the current location and a specified time period matching the current time.

2. The method according to claim 1, further comprising:

recording the volume state package according to the current location, the current time and the a preset volume setting of the electronic device when neither the volume state package comprising the specified location nor the matching volume state package is included in the volume state file, and adding the recorded volume state package into the volume state file corresponding to the executed application.

3. The method according to claim 2, further comprising:

determining whether the volume setting of the electronic device changes when electronic device executes the executed application with the preset volume setting or the adjusted volume setting; and updating the volume level of the recorded volume state package or the volume level of the matching volume state package according to the changed volume setting.

4. The method according to claim 1, further comprising:

recording a location of the electronic device when the electronic device is switched to a silent mode;

reading the current location of the electronic device periodically;

prompting a user of the electronic device whether to start the silent mode or not, when the current location matches the recorded location;

determining whether a distance between the current location and recorded location exceeds a preset distance after the electronic device switches to the silent mode according to the prompt; and prompting the user whether to turn off the silent mode or not when the distance between the current location and the recorded location exceeds the preset distance.

5. The method according to claim 1, wherein a distance between the specified location and the current location is within a preset range, and the current time belongs to the specified time period.

6. The method according to claim 1, wherein the volume state file corresponding to the executed application has a specified name comprising a name of the executed application and preset characters.

7. A non-transitory computer-readable storage medium storing a set of instructions, when executed by at least one processor of an electronic device, cause the at least one processor to perform a method for adjusting a volume setting of the electronic device, the method comprising:

reading a current location and a current time of the electronic device at a predetermined time interval when the electronic device executes an application of the electronic device;

determining whether there is a volume state file corresponding to the executed application stored in a storage system of the electronic device;

creating the volume state file corresponding to the executed application in the storage system when no volume state file corresponding to the executed application is stored in the storage system, and recording a time period corresponding to the current time, the current location and a volume level corresponding to a preset volume setting of the electronic device as a volume state package into the volume state file;

adjusting the volume setting of the electronic device according to a volume level of a matching volume state package in the volume state file when the volume state file corresponding to the executed application is stored in the storage system, wherein the matching volume state package comprises a specified location which matching the current location and a specified time period which matching the current time.

8. The storage medium according to claim 7, wherein method further comprising:

recording the volume state package according to the current location, the current time and the a preset volume setting of the electronic device when neither the volume state package comprising the specified location nor the matching volume state package is included in the volume state file, and adding the recorded volume state package into the volume state file corresponding to the executed application.

9. The storage medium according to claim 8, wherein the method further comprising:

determining whether the volume setting of the electronic device changes when electronic device executes the executed application with the preset volume setting or the adjusted volume setting;

updating the volume level of the recorded volume state package or of the matching volume state package according to the changed volume setting.

10. The storage medium according to claim 7, wherein the method further comprising:

recording a location of the electronic device when the electronic device is switched into a silent mode;

reading the current location of the electronic device periodically;

prompting a user of the electronic device whether to start the silent mode or not, when the current location matches the recorded location;

determining whether a distance between the current location and recorded location exceeds a preset distance after the electronic device switches into the silent mode according to the prompt;

prompting the user whether to turn off the silent mode or not when the distance between the current location and recorded location exceeds the preset distance.

11. The storage medium according to claim 7, wherein a distance between the specified location and the current location is with a preset range, and the current time belongs to the specified time period.

12. The storage medium according to claim 7, wherein the volume state file corresponding to the executed application has a specified name comprising a name of the executed application and preset characters.

13. An electronic device, comprising:

at least one processor; and a storage system storing one or more programs, which when executed by the at least one processor, cause the at least one processor to:

obtain a current location and a current time of the electronic device at a predetermined time interval when the electronic device executes an application;

determine whether a volume state file corresponding to the executed application is stored in a storage system of the electronic device;

create the volume state file corresponding to the executed application in the storage system and record a time period corresponding to the current time, the current location and a volume level corresponding to a preset volume setting of the electronic device as a volume state package into the volume state file when no volume state file corresponding to the executed application is stored in the storage system;

adjust the volume setting of the electronic device according to a volume level of a matching volume state package in the volume state file when the volume state file corresponding to the executed application is stored in the storage system, wherein the matching volume state package comprises a specified location matching the current location and a specified time period matching the current time.

14. The electronic device according to claim 13, wherein the one or more programs further cause the at least one processer to:

record the volume state package according to the current location, the current time and the a preset volume setting of the electronic device when neither the volume state package comprising the specified location nor the matching volume state package is included in the volume state file, and adding the recorded volume state package into the volume state file corresponding to the executed application.

15. The electronic device according to claim 14, wherein the one or more programs further cause the at least one processer to:

determine whether the volume setting of the electronic device changes when electronic device executes the executed application with the preset volume setting or the adjusted volume setting; and update the volume level of the recorded volume state package or the volume level of the matching volume state package according to the changed volume setting.

16. The electronic device according to claim 13, wherein the one or more programs further cause the at least one processer to:
- record a location of the electronic device when the electronic device is switched to a silent mode;
- read the current location of the electronic device periodically;
- prompt a user of the electronic device whether to start the silent mode or not, when the current location matches the recorded location;
- determine whether a distance between the current location and recorded location exceeds a preset distance after the electronic device switches to the silent mode according to the prompt;
- prompt the user whether to turn off the silent mode or not when the distance between the current location and the recorded location exceeds the preset distance.

17. The electronic device according to claim 13, wherein a distance between the specified location and the current location is within a preset range, and the current time belongs to the specified time period.

18. The electronic device according to claim 13, wherein the volume state file corresponding to the executed application has a specified name comprising a name of the executed application and preset characters.

* * * * *